United States Patent
Krawczyk et al.

(10) Patent No.: US 6,634,600 B2
(45) Date of Patent: Oct. 21, 2003

(54) SATELLITE CONSTELLATION FOR MEASURING ATMOSPHERIC WIND SPEEDS USING DOPPLER LIDAR

(75) Inventors: Rodolphe Krawczyk, Villeneuve Loubet (FR); Jean-François Plantier, Nice (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/918,502

(22) Filed: Aug. 1, 2001

(65) Prior Publication Data

US 2002/0036766 A1 Mar. 28, 2002

(30) Foreign Application Priority Data

Aug. 2, 2000 (FR) ............................................. 00 10190

(51) Int. Cl.⁷ ................................................ B64G 9/00
(52) U.S. Cl. ................ 244/158 R; 701/226; 356/28.5; 73/170.16; 702/3
(58) Field of Search ..................... 244/158 R; 701/226; 356/28.5, 139.03; 342/352, 354; 73/170.16, 170.28; 702/3

(56) References Cited

U.S. PATENT DOCUMENTS

| | | | |
|---|---|---|---|
| 4,809,935 A | 3/1989 | Draim | |
| 5,227,802 A | * 7/1993 | Pullman et al. | ............. 342/353 |
| 5,367,371 A | 11/1994 | Krawczyk | |
| 5,872,621 A | 2/1999 | Wilkerson et al. | |
| 6,035,710 A | * 3/2000 | Hutchison et al. | ........ 73/170.16 |
| 6,046,695 A | * 4/2000 | Opochler et al. | ............. 342/25 |

FOREIGN PATENT DOCUMENTS

| EP | 0 017 597 A1 | 10/1980 |
|---|---|---|
| EP | 0 510 789 A1 | 10/1992 |

OTHER PUBLICATIONS

NOAA forecast systems laboratory, "Evaluation of a space=based windfinding Lidar progress report"Jan. 28, 2000.*
Amnon Ginati et al, "A Spaceborne Wind Sounder Lidar (sbl)" 12th AIAA/usu, Aug. 1998.*

* cited by examiner

Primary Examiner—Galen L. Barefoot
(74) Attorney, Agent, or Firm—Sughrue Mion, PLLC (57) ABSTRACT

A constellation of satellites comprising at least two satellites in the same orbit is used to measure atmospheric wind speeds by means of a spatial wind lidar; each satellite carries a Doppler lidar, with a fixed sight axis. The orbit is a polar or quasi-polar orbit, with an orbital altitude from 350 to 500 km. The sight angles and the distribution of the satellites in the orbit are chosen so that the tracks on the surface of the Earth of the sight axes of the satellites of the constellation are substantially coincident over half of the surface of the Earth and regularly distributed over the other half of the surface of the Earth.

13 Claims, 6 Drawing Sheets

FIG_1    FIG_2

FIG_3    FIG_5    FIG_4

FIG_8    FIG_7

FIG_6

FIG_10

FIG_11

FIG_12

FIG_13

FIG_15

FIG_17

FIG_16

FIG_14

FIG_18

SATELLITE CONSTELLATION FOR MEASURING ATMOSPHERIC WIND SPEEDS USING DOPPLER LIDAR

CROSS-REFERENCE TO RELATED APPLICATIONS

This application is based on French Patent Application No. 00 10 190 filed Aug. 2, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to measuring atmospheric wind speeds using spatial wind lidar. The atmospheric wind speed is a fundamental component of operational meteorology; it is therefore of direct interest to scientists and to many commercial companies.

2. Description of the Prior Art

Obtaining terrestrial global measurements is no longer compatible with existing ground and airborne systems, which cover only a limited fraction of the terrestrial surface (oceanic areas in particular are very badly covered); it has therefore been proposed to carry out measurements from space, using Doppler lidar, to obtain sufficient meshing of measurements to satisfy the requirements stated by meteorologists, in particular of Eumetsat and Météo-France.

The principle of lidar (also known as optical radar) is analogous to that of radar: an optical wave emitted by a laser emitter is back-scattered by molecules and particles in the atmosphere to a receiver which is located, in the case of spatial lidar, near the laser emitter; the received signal is then fed to a detector and processor system and then transmitted to the ground for possible additional processing. The return signal is sampled in time to obtain information corresponding to each atmosphere layer through which it has passed: the lidar is therefore inherently a sounder. In the case of Doppler lidar, the processing of the signal entails using means that depend on the type of detection employed (direct, coherent, heterodyne, etc) to determine the frequency difference between the wavelength emitted by the laser and that of the return signal, which yields directly the projection onto the sight axis of the speed difference between the carrier of the emitter and the molecules and/or particles that back-scattered the laser signal; appropriate algorithms deduce from the speed difference information on the components of the speed of the wind in the sounded area: ideally, measurements along three different sight axes at a given point yield the three components of the wind vector at that point (two in the horizontal plane and the third along a vertical at the location concerned). The vertical speed of the wind can also be ignored, two measurements at each point being considered sufficient.

U.S. Pat. No. 5,367,371 describes the principle of atmospheric wind speed measurement by spatial lidar, as explained above. It suggests providing a satellite with two telescopes with sight angles of 45° to the roll axis of the satellite. With regard to orbits, the document limits itself to describing the locations of the points of impact of the rays of the two telescopes for a given orbit of the satellite. The problem of terrestrial coverage is mentioned, but in point of fact merely in terms of it being a requirement, with no real solution being provided.

U.S. Pat. No. 5,872,621 concerns a solution to the problem of reception in spatial lidar; it proposes to use a holographic optical member to direct the back-scattered beam toward the receiver of the lidar. The holographic optical member is driven in rotation to scan the area to be covered. As in the previous document, this document refers to the coverage problem only to show the cycloid curve formed by the locus of the points of impact of the beam on the ground for a given trajectory of the satellite.

Additionally, various satellite observation methods based on the Doppler effect have been proposed. JP-A-10 19683 proposes, in a constellation of at least three satellites, sending laser pulses from one satellite to a mirror on other satellites rotating in opposite directions. The pulses are reflected toward the source satellite and the time difference between the pulses is measured; a measured value of the electromagnetic ether speed is deduced from this. U.S. Pat. No. 4,463,357 proposes to measure the electron content of the ionosphere between a spacecraft and a receiver by crossed correlation of two coherently modulated signals; using GPS satellites and a plurality of ground stations, it is possible to locate terrestrial events that give rise to ionospheric disturbances—such as volcanic eruptions or the launch of intercontinental missiles. U.S. Pat. No. 5,428,358 proposes an analogous way to measure the electron content of the ionosphere using satellites of the GPS constellation. U.S. Pat. No. 5,675,081 proposes a system for measuring the water content of the atmosphere using water vapor radiometers and the satellites of the GPS constellation. The above documents are silent on the subject of measuring atmospheric wind speeds; nor do they mention the problem of determining orbits for such measurements.

Thus measuring atmospheric wind speeds gives rise to various problems. A first major problem lies in the weakness of the resources available on board a satellite (mainly in terms of electrical power), compared to those available on the ground, given the very severe demands of scientists both as to the accuracy of the wind speed measurement and the number of sight axes. A second problem is that of the geographical coverage of the measurements: a spatial system for measuring wind speeds using lidar mounted on a constellation of satellites would be of greater interest if it were able to provide:

the widest possible coverage of the terrestrial surface, and the greatest number of measurements for each individual cell sounded, using different sight axes; a cell typically has the following dimensions: 200×200 km horizontally, with a vertical dimension of a few hundreds of meters, typically from 500 m to 1 km.

The invention proposes a solution to the various problems just mentioned. First of all, it uses a limited number of very simple measuring satellites. A preferred embodiment of the invention provides good terrestrial coverage. In a first configuration, the measurement points are distributed substantially regularly over half of the surface of the terrestrial globe, i.e. the sight axes of the instruments mounted on the various satellites are projected onto the ground at points which, combined with each other, constitute trajectories (referred to as tracks) whose intersections with the equator are quasi-equidistant. In a second configuration, over the other half of the surface of the terrestrial globe, the measurement points are grouped by areas (typically with dimensions less than 200×200 km), i.e. the sight axes of the instruments mounted on the various satellites are projected onto the ground at points contained within said areas. The two configurations are each produced over a period of 12 hours, at intervals of 24 hours, and the halves of the surface of the globe referred to vary in time at a rate that can be chosen by varying the altitude of the satellites. This embodiment of the invention therefore yields measurements that are easy for meteorologists to use.

SUMMARY OF THE INVENTION

The invention proposes a constellation of satellites for measuring atmospheric wind speeds, the constellation including at least two satellites distributed over the same non-geosynchronous orbit and each carrying a Doppler lidar.

The sight axis of the Doppler lidar of a satellite is preferably fixed. In one embodiment of the invention the orbit is a polar or quasi-polar orbit. It is also advantageous if the orbital altitude is from 350 km to 500 km.

In one embodiment the constellation includes three satellites and the orbital altitude is from 400 km to 500 km.

It is also advantageous if the sight angle of one satellite relative to the nadir is from 30° to 50° and is preferably about 45°.

In another embodiment the satellites of the constellation have different angles between the projection of the sight axis on the surface of the Earth and the projection of the speed of the satellite on the Earth.

In this case the constellation can include two satellites and the difference between the angles is then from 75° to 105° and is preferably about 90°.

The constellation can also include three satellites and in this case the difference between the angles is from 90° to 150° and is preferably about 120°.

The tracks on the surface of the Earth of the sight axes of the satellites of the constellation are advantageously substantially coincident in a first area of the surface of the Earth. The tracks on the surface of the Earth of the sight axes of the satellites of the constellation can also be substantially regularly distributed in a second area of the surface of the Earth.

In one embodiment the constellation satisfies the condition:

$$\frac{2\pi T_S}{nT}R < \frac{H}{\cos\gamma}|\tan\alpha_{i+1}\sin\varphi_{i+1} - \tan\alpha_i\sin\varphi_i| + \frac{T_S}{T}R\psi_{i,i+1} \le a + \frac{2\pi T_S}{nT}R$$

in which n is the number of satellites in the constellation, T is the period of rotation of the Earth, $T_S$ is the orbital period, R is the radius of the Earth, H is the orbital altitude, $\gamma$ is the angle between the projection of the speed of satellite t on the surface of the Earth on passing over the equator and the rotation speed of the earth at the equator, $\alpha_i$ is the angle between the sight axis of satellite i and the nadir, (Pi is the angle between the projection on the Earth of the sight axis of satellite i and the projection on the Earth of the speed of that satellite, $\psi_{i,i+1}$ is the angle measured in the plane of the orbit between the satellites i and i+1, and a is a parameter analogous to a distance and is less than 500 km.

In this case it is advantageous if the parameter a has a value less than 100 km and preferably less than 50 km.

In another embodiment the angle between two satellites of the constellation in the plane of the orbit satisfies the condition:

$$\frac{T_S}{T}R\psi_{i,i+1} \le \frac{H}{\cos\gamma}|\tan\alpha_i\sin\varphi_i - \tan\alpha_{i+1}\sin\varphi_{i+1}| \le \frac{T_S}{T}R\psi_{i,i+1} + b$$

in which T is the rotation period of the Earth, $T_S$ is the orbital period, H is the orbital altitude, $\gamma$ is the angle between the projection of the speed of satellite i on the surface of the Earth on crossing the equator and the rotation speed of the Earth at the equator, $\alpha_i$ is the angle between the sight axis of satellite i and the nadir, $\phi_i$ is the angle between the projection of the sight axis of satellite i on the Earth and the projection of the speed of the satellite on the Earth, $\psi_{i,i+1}$ is the angle measured in the plane of the orbit between satellites i and i+1, and b is a parameter analogous to a distance and is less than 200 km.

In this case the parameter b has a value less than 20 km and preferably less than 10 km.

Other features and advantages of the invention will become apparent on reading the following description of embodiments of the invention, which description is given by way of example and with reference to the accompanying drawings.

DETAILED DESCRIPTION OF THE PREFERRED EMBODIMENTS

The invention proposes to use a constellation of satellites each having a sight axis (or firing line) that is preferably fixed to measure atmospheric winds by Doppler lidar. The satellites are distributed around the some orbit, to provide good terrestrial coverage. The invention therefore enables the structure of the satellite to be simplified without compromising the results obtained. Possible satellite positions and firing angles are explained in detail in the remainder of the description.

Figure 1:
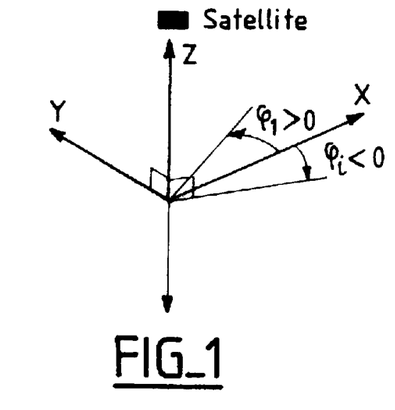
FIG. 1 is a schematic representation of a system of axes used for a satellite.
Figure 2:
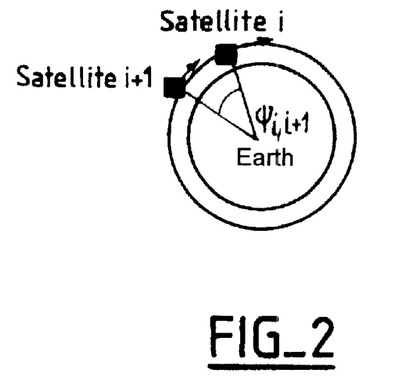
FIG. 2 is a schematic representation of a constellation of satellites.

FIGS. 1 and 2 show the conventions used hereinafter to explain the invention. FIG. 1 is a diagrammatic representation of a system of axes used for a satellite; the system of axes is a direct orthonomic system of axes. The axis z passes through the center of the Earth and the satellite. The axis x is parallel to the projection of the speed of the satellite onto the surface of the Earth; the axis y is perpendicular to the previous two axes. For the satellite i, $\phi_i$ denotes the azimuth of the laser sight axis relative to the projection of the speed of the satellite on the ground, in other words the angle between the axis x and the projection of the sight axis on the ground; the sign of this angle is determined by the direction of the system of axes, the angle being positive when the projection is in the first quadrant, between the axes x and y, as shown in the figure. For the satellite i, $\alpha_i$ denotes the angle between the sight axis and the nadir, in other words the angle between the axis z and the sight axis. FIG. 2 is a diagrammatic representation in the plane of their orbit, which is a polar orbit in this example, of a constellation of two satellites i and i+1; by convention, the satellite i is ahead of the satellite i+1 in the orbital arc, in the direction in which they travel around the orbit. The relative angular phase of the two consecutive satellites i and i+1 is denoted $\psi_{i,i+1}$.

Possible characteristics of a constellation in accordance with the invention are described next. The constellation comprises at least two satellites; the examples shown in FIGS. 3 to 9 are of constellations with two satellites, which provide satisfactory results, and which enable measurement of two components of wind speeds, typically horizontal wind speeds. Constellations of three satellites can also be used, as in the examples shown in FIGS. 10 to 18. Constellations of three satellites enable three components of wind speed to be measured, and therefore horizontal and vertical speeds. The invention applies to a constellation reduced to two or three satellites, as in these examples; it can easily be generalized to n satellites (n>3), although a constellation with more than three satellites is of only limited benefit, for the following reasons:

three measurements along different sight axes are sufficient to determine the wind vector in three dimensions, and the cost of a system with n>3 satellites would run the risks of becoming prohibitive.

The orbit of the satellites in the constellation is advantageously a polar or quasi-polar orbit; a quasi-polar orbit is an orbit whose inclination is from approximately 80° to approximately 100°; one example of a quasi-polar orbit is a heliosynchronous orbit, which enables the satellite to overfly the Earth under similar conditions of illumination from one orbit to another. A heliosynchronous orbit is particularly suitable for the mission described, in that it ensures good coverage of the whole of the terrestrial surface; the invention can also be applied to other types of orbit, such as highly inclined orbits; such orbits enable tropical areas to be overflown more frequently than a polar or quasi-polar orbit, but provide no or only poor coverage of northern areas.

The orbital altitude H of the satellites of the constellation is typically from 350 km to 500 km; in the case of a constellation with three satellites, it is advantageous for the altitude to be from 400 km to 500 km. That range of altitudes satisfies two constraints; firstly, the accuracy of the wind speed measured by lidar depends on the magnitude of the back-scattered signal: low altitudes, i.e. altitudes below 500 km, are therefore preferred, since the intensity of the back-scattered signal is inversely proportional to the distance between the transmitter and the back-scattering target. On the other hand, the lower the orbital altitude, the shorter the service life of the satellite, because of atmospheric braking, unless the satellite carries more fuel, which commensurately increases the mass and the volume of the satellite. It is advantageous to choose altitudes greater than 350 km.

The orbital period $T_S$ is then deduced from the chosen altitude; it is of the order of 90 to 100 minutes for orbital altitudes from 350 km to 500 km, and is given by the equation:

$$T_S \approx 2\pi \sqrt{\frac{(R+H)^3}{\mu}}$$

in which $\mu$ is the terrestrial gravitational constant, equal to approximately $4 \times 10^5$ km$^3$/s$^2$, R is the radius of the Earth (approximately 6 400 km) and H is the orbital altitude.

The distribution of the satellites in the orbit is advantageously a function of the sight axis chosen for each satellite, discussed next. The sight angle of the laser relative to the nadir for a satellite is preferably from 30° to 50°, and is typically around 45°, as in the examples given below. In the FIG. 1 system of axes, this angle is measured between the axis z and the sight axis—it being understood that the satellite is sighting toward the surface of the Earth. The lower limit of this range minimizes the error produced into the calculated horizontal component of the wind by the vertical speed of the wind, especially in a configuration with two satellites; at the limit, an angle of 90° would be the optimum, but the laser would no longer be firing into the atmosphere. The upper value of the range is a response to the constraints of minimizing the thickness of the atmosphere passed through and maximizing the back-scattered signal: the greater the angle, the greater the quantity of air passed through, and the weaker the signal back-scattered by the masses of air in motion.

In the preferred embodiment, the invention proposes to choose the sight axis of each satellite and the distribution of the satellites of the constellation so as to define two areas of the surface of the Earth. In a first area, the tracks on the surface of the Earth of the sight axes of the satellites of the constellation are substantially coincident; in other words, in that area, a point on the surface of the Earth reached by the sight axis of a first satellite of the constellation is then reached by the sight axis of the other satellites of the constellation. The accuracy in this case is that required by meteorologists. For wind speed measuring applications, it is typically beneficial to know the speed in areas 200 km by 200 km. In the context of this description, the tracks are considered to be coincident or substantially coincident if the distance between the tracks is less than 200 km, or even less than 100 km. In this first area, the invention can measure wind speeds horizontally (in the case of a constellation with two satellites) or horizontally and vertically (in the case of three satellites). The speed of the wind can therefore be determined at each of the points sighted.

In a second area, the measurement points are distributed in a substantially regular manner; in other words, the intersections with the surface of the Earth of the sight axes of the various satellites of the constellation constitute trajectories or tracks. The intersections of these tracks with the equator are quasi-equidistant. In this area one-dimension information on the wind is therefore obtained, i.e. the projection of the wind along the sight axis for each measurement, at as many locations on the Earth as there are measurement points; more numerous measurement points are obtained in this area than in the first area, as shown in the figures.

Each of the two areas advantageously corresponds to half the surface of the Earth. Also, by optimizing the orbital characteristics:

the two configurations are each produced over a period of 12 hours, at intervals of 24 hours, and the areas mentioned vary in time at a rate that can be chosen by varying the altitude of the satellites.

Thus for a given point on the surface of the Earth, and over a period of 24 hours, it is possible to obtain a measurement of the wind speed with two or three components and a measurement of the wind speed in a single direction. The invention lends itself particularly well to meteorological applications, with one measurement and one update or confirmation of the measurement every 24 hours. As the examples show, there are terrestrial areas, located toward latitudes of the order of ±50° (with two satellites) or ±20° (with two satellites), in which, in 12 hours and over one half of the terrestrial surface, the sight axes will reach substantially the same cells, with the benefit of a more homogeneous coverage over the other half of the terrestrial surface, in which the cells will be addressed by only one sight axis.

The invention has the unique advantage of combining, with the same constellation of satellites, measurements distributed substantially regularly over the surface of the terrestrial globe and measurements that are distributed less uniformly but are concentrated in certain cells: the areas addressed by several sight axes over a time period equivalent to a fraction of an orbit (typically a few tens of minutes) provide wind measurements that are more directly usable, through reducing recourse to assimilation models; in particular, for the situation with three sight axes, the three components of the speed of the wind at the measurement point are obtained in the cells of the first area. The invention therefore enables the calibration of the models to be improved if, in these cells, the measurement of the wind speed can be obtained by other in situ means, for example balloons.

The invention also makes it possible to shift the sighted areas by varying the orbital altitude. The rate at which the areas are shifted can be from a few days to a few weeks, depending on user requirements; measurements can therefore be carried out at different places.

The position of the satellites of the constellation in the orbit and the sight axes can be determined in the following manner. To obtain a regular distribution of the tracks of the satellites in the second area, the following condition is advantageously applied:

$$\frac{2\pi T_S}{nT}R < \frac{H}{\cos\gamma}|\tan\alpha_{i+1}\sin\varphi_{i+1} - \tan\alpha_i\sin\varphi_i| + \frac{T_S}{T}R\psi_{i,i+1} \le a + \frac{2\pi T_S}{nT}R \quad [1]$$

for i varying from 1 to n−1, where n is the number of satellites in the constellation. In the above equation, $T_S$, R, H, $\alpha_i$, $\phi_i$, $\psi_{i,i+1}$ have the meaning referred to above. T is the period of rotation of the Earth, that is to say approximately 86 200 s and $\gamma$ is the angle between the projection of the speed of the satellite i on the surface of the Earth on passing over the equator and the rotation speed of the Earth at the equator; in the example considered here of a polar orbit:

$$\tan\gamma \approx \frac{2\pi R}{T}\sqrt{\frac{R+H}{\mu}}$$

In equation [1], the parameter a is an error term, typically of a few hundred kilometers, for example less than 500 km; the farther from zero the value of a, the less equidistant are the intersections of the tracks of the trajectories with the equator; consequently, ideally: a=0, in other words:

$$\frac{H}{\cos\gamma}|\tan\alpha_{i+1}\sin\varphi_{i+1} - \tan\alpha_i\sin\varphi_i| + \frac{T_S}{T}R\psi_{i,i+1} = \frac{2\pi T_S}{nT}R \quad [1']$$

The above condition ensures a regular distribution of trajectories in the second area, in other words good scanning of the surface of the Earth in the second area.

The following constraint can be imposed to ensure grouping of the tracks of the satellites in the first area:

$$\frac{T_S}{T}R\psi_{i,i+1} \le \frac{H}{\cos\gamma}|\tan\alpha_i\sin\varphi_i - \tan\alpha_{i+1}\sin\varphi_{i+1}| \le \frac{T_S}{T}R\psi_{i,i+1} + b \quad [2]$$

in which the various parameters have the same meaning and b is an error term, typically of a few tens of kilometers, generally less than 200 km. The farther from zero the value of b, the farther apart are the projections of the sight axes on the ground; consequently, ideally: b=0, in other words:

$$\frac{H}{\cos\gamma}|\tan\alpha_{i+1}\sin\varphi_{i+1} - \tan\alpha_i\sin\varphi_i| = \frac{T_S}{T}R\psi_{i,i+1} \quad [2']$$

The above condition ensures good overlapping of the tracks in the first area. Values of b less than 20 km, or even less than 10 km, can be chosen, as in the configurations with three satellites referred to above by way of example.

In the preferred embodiment of the invention the parameters a and b have zero values and $\psi_{i,i+1}=\pi/n$, in other words an angle between satellites of 90° is chosen for a constellation of two satellites and angle between satellites of 60° is chosen for a constellation of three satellites; under these conditions, in the simplified particular case where $\alpha_i=\alpha_{i+1}$ (=$\beta$), given the orders of magnitude of the various parameters, the following results are obtained.

For a constellation of two satellites, compliance with equations [1'] and [2'] imposes that $\phi_i$ and $\phi_{i-1}$ be of opposite sign; if it is additionally assumed (this is not a restricting condition) that $\phi_1=-\phi_2$ (=$\phi$, positive), the following equation is obtained:

$$\tan\alpha\sin\varphi = \frac{\pi}{4}\cos\gamma\frac{T_S R}{TH}$$

that varies between approximately 0.92 for H=350 km and approximately 0.66 for H=500 km.

For values of the angle $\alpha$ of 45°, possible values for the angle $\phi$ are therefore of the order of 66° for an altitude of 350 km and of the order of 41° for an altitude of 500 km.

In a constellation with three satellites the above conditions are written, for zero values of a and b:

$$\tan\alpha(\sin\varphi_2 - \sin\varphi_1) = \tan\alpha(\sin\varphi_3 - \sin\varphi_2) = \frac{\pi}{3}\cos\gamma\frac{T_S R}{TH}$$

this quantity varying from approximately 1.22 for H=350 km to approximately 0.88 for H=500 km.

For H=500 km, one possible solution is $\phi_2=0$ and $\phi_1=-\phi_3$ (=$\phi$, positive); for a value of $\alpha$ of 30°, a value of $\phi$ is obtained of the order 50°, and for a value of $\alpha$ of 45°, a value of $\phi$ of the order 62°. In the case of a configuration with three satellites, equations [1'] and [2'] can be satisfied only by values of the altitude H satisfying the condition:

$$\frac{H}{\sqrt{(R+H)^3}\cos\left(\text{Arctan}\frac{2\pi}{R}\sqrt{\frac{R+H}{\mu}}\right)} > \frac{2\pi^2}{3}\frac{R}{T\sqrt{\mu}}$$

in other words, approximately, H>435 km.

Solutions can of course be found for lower altitude values, in particular with values of the angle $\alpha$ that are different for the satellites of the constellation, or for nonzero values of the parameters a and b.

The equations given above are for a flat Earth approximation. The error induced by this approximation is of the order of a few percent (for H=500 km and α=45° the error is approximately 4%), and the equations therefore remain applicable.

If the flat Earth approximation is not used, the above equations [1], [1'], [2] and [2'] are modified by replacing Htanα with:

$$R\left[\text{Arcsin}\left(\frac{R+H}{R}\sin\alpha\right) - \alpha\right]$$

Equation [1] then becomes equation [1$_0$]:

$$\frac{2\pi T_S}{nT}R < U \leq a + \frac{2\pi T_S}{nT}R \text{ with}$$

$$U = \frac{R}{\cos\gamma}\left[\left[\text{Arcsin}\left(\frac{R+H}{R}\sin\alpha_{i+1}\right) - \alpha_{i+1}\right]\sin\varphi_{i+1} - R\left[\text{Arcsin}\left(\frac{R+H}{R}\sin\alpha_i\right) - \alpha_i\right]\sin\varphi_i\right] + \frac{T_S}{T}R\psi_{i,j+1}$$

for i=1 to n−1.

Equation [1'] becomes equation [1$_0'$]:

$$\frac{R}{\cos\gamma}\left[\left[\text{Arcsin}\left(\frac{R+H}{R}\sin\alpha_{i+1}\right) - \alpha_{i+1}\right]\sin\varphi_{i+1} - \left[\text{Arcsin}\left(\frac{R+H}{R}\sin\alpha_i\right) - \alpha_i\right]\sin\varphi_i\right] + \frac{T_S}{T}R\psi_{i,j+1} = \frac{2\pi T_S}{nT}R$$

Equation [2] becomes equation [2$_0$]:

$$\frac{T_S}{T}R\psi_{i,j+1} \leq V \leq \frac{T_S}{T}R\psi_{i,i+1} + b \text{ with}$$

$$V = \frac{R}{\cos\gamma}\left[\left[\text{Arcsin}\left(\frac{R+H}{R}\sin\alpha_i\right) - \alpha_i\right]\sin\varphi_i - \left[\text{Arcsin}\left(\frac{R+H}{R}\sin\alpha_{i+1}\right) - \alpha_{i+1}\right]\sin\varphi_{i+1}\right]$$

for i=1 to n−1.

Equation [2'] becomes equation [2$_0'$]:

$$R\left[\left[\text{Arcsin}\left(\frac{R+H}{R}\sin\alpha_{i+1}\right) - \alpha_{i+1}\right]\sin\varphi_{i+1} - \left[\text{Arcsin}\left(\frac{R+H}{R}\sin\alpha_i\right) - \alpha_i\right]\sin\varphi_i\right] + \frac{T_S}{T}R\psi_{i,j+1}$$

For three satellites, equations [1$_0'$] and [2$_0'$] can be satisfied only for H>418 km if the roundness of the Earth is taken into account (compared to 435 km if the Earth is considered flat). Note that the results set out in the remainder of the description with reference to FIGS. 3 to 18 were obtained from a simulation taking the roundness of the Earth into account.

Figure 3:
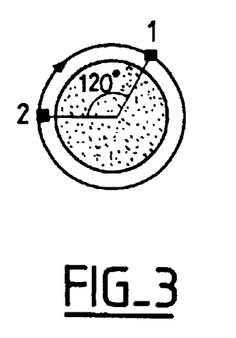
FIG. 3 is a diagrammatic representation of a constellation of two satellites in a first embodiment of the invention.
Figure 4:
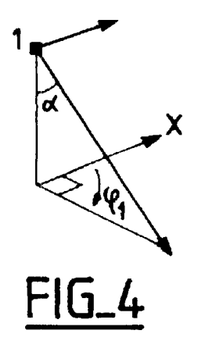
FIG. 4 is a diagrammatic representation of the sight angle of the first satellite from the constellation shown in FIG. 3.
Figure 5:
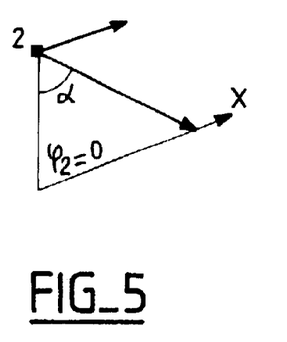
FIG. 5 is a diagrammatic representation of the sight angle of the second satellite from the constellation shown in FIG. 3.

Embodiments of the invention are described next with reference to FIGS. 3 to 18. FIG. 3 is a diagrammatic representation of a constellation of two satellites in a first embodiment of the invention; it shows the two satellites in the plane of their orbit, which is a polar orbit. The satellites are offset by $\psi_{1,2}$=120° in the orbit. FIG. 4 is a diagrammatic representation of the sight angle of the first satellite of the constellation from FIG. 3; the value of the angle α is 45° and the first satellite sights on the right-hand side, i.e. with an angle $\phi_1$ of −90°. FIG. 5 is a diagrammatic representation of the sight angle of the second satellite of the constellation from FIG. 3; the value of the angle α is again 45°, and the angle $\phi_2$ is zero. In this configuration, the respective values of the parameters a and b are 60 km and 400 km.

Figure 6:
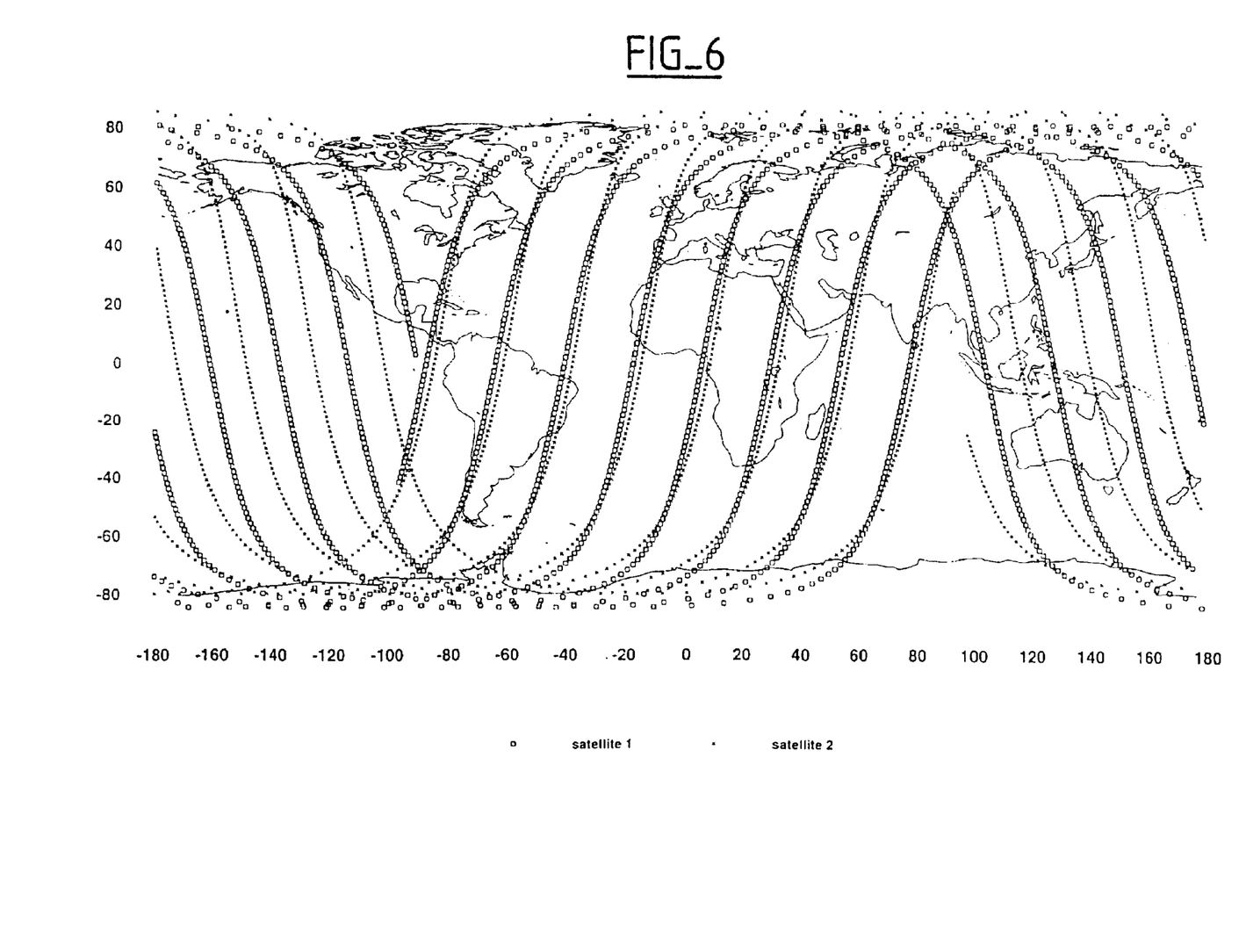
FIG. 6 shows the intersections of the sight axes with the surface of the globe for the constellation shown in FIG. 3.

FIG. 6 is a representation of the intersections of the sight axes with the surface of the globe for the FIG. 3 constellation; the track of the first satellite is shown by squares and the track of the second satellite is shown by crosses. The first area and the second area, which are indicated at the bottom of the diagram, can clearly be distinguished in this figure.

Figure 7:
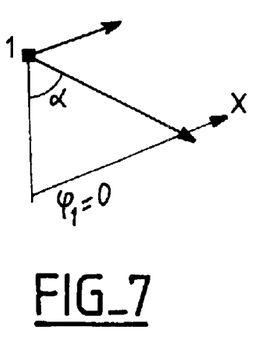
FIGS. 7 to 9 are similar to FIGS. 4 to 6 for another constellation in accordance with the invention comprising two satellites.
Figure 8:
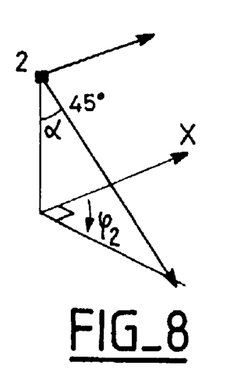
Figure 9:
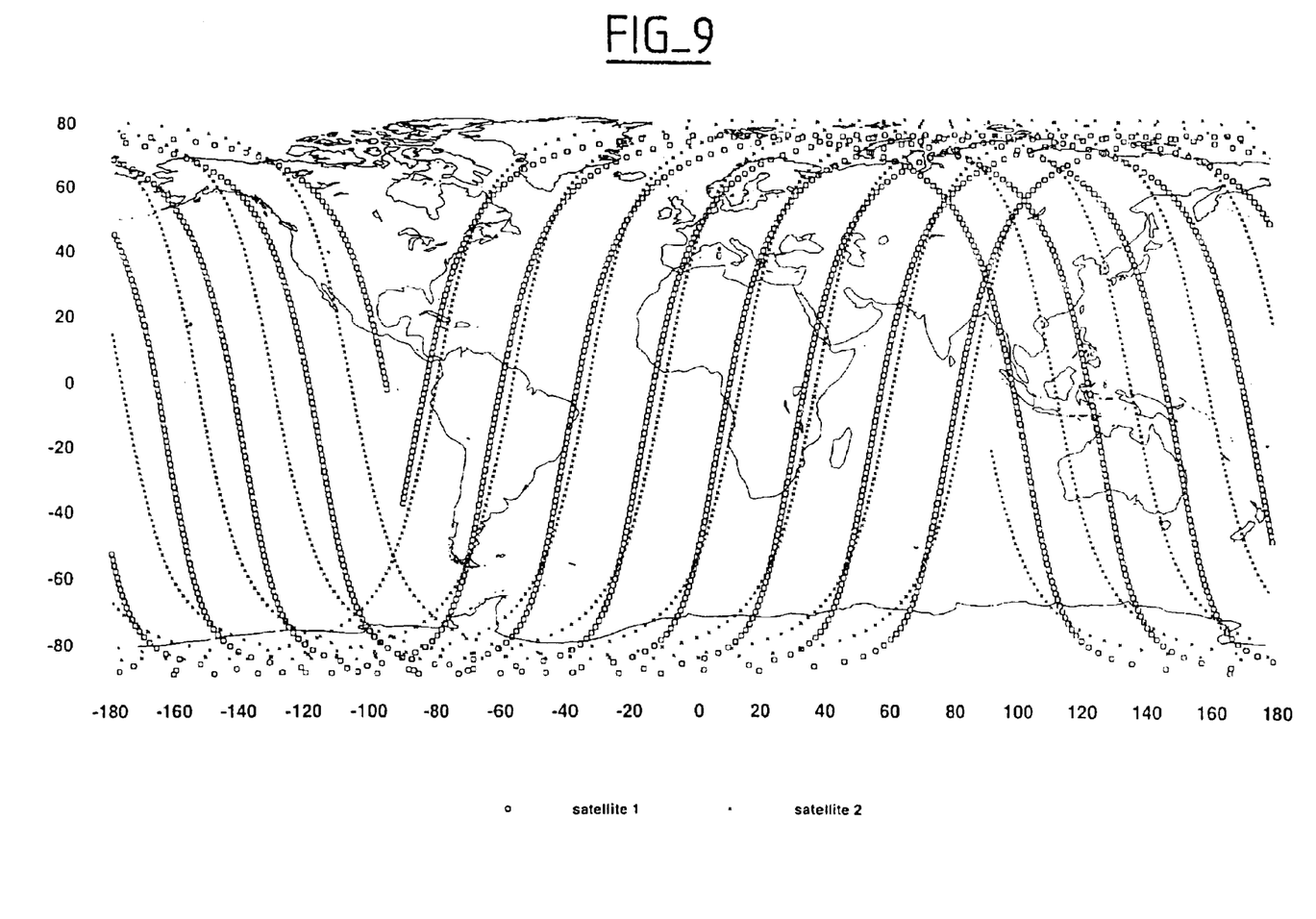

FIGS. 7 to 9 are representations similar to FIGS. 4 to 6 for another constellation in accordance with the invention with two satellites; in this constellation, the position of the two satellites in the orbit is the same as in FIG. 3. FIG. 7 shows the sight angle of the first satellite, with respective values of the angles α and $\phi_1$ of 45° and 0°. FIG. 8 shows the sight angle of the first satellite, with respective values of the angles α and $\phi_2$ of 45° and −90°. FIG. 9 shows the track of the satellites on the surface of the Earth. In this configuration the respective values of the parameters a and b are 60 km and 400 km, as in the preceding configuration. Although these values are not zero, the figures show that the measurement points are distributed in two areas, as proposed by the invention.

Figures 10, 11:
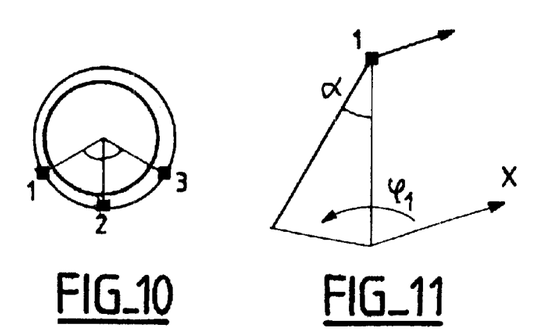
FIGS. 10 to 14 are similar to FIGS. 3 to 6 for a constellation in accordance with the invention comprising three satellites.
Figure 12:
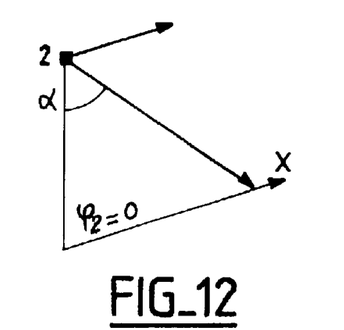
Figure 13:
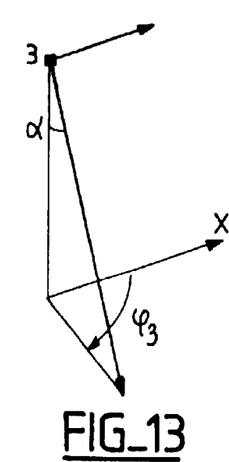
Figure 14:
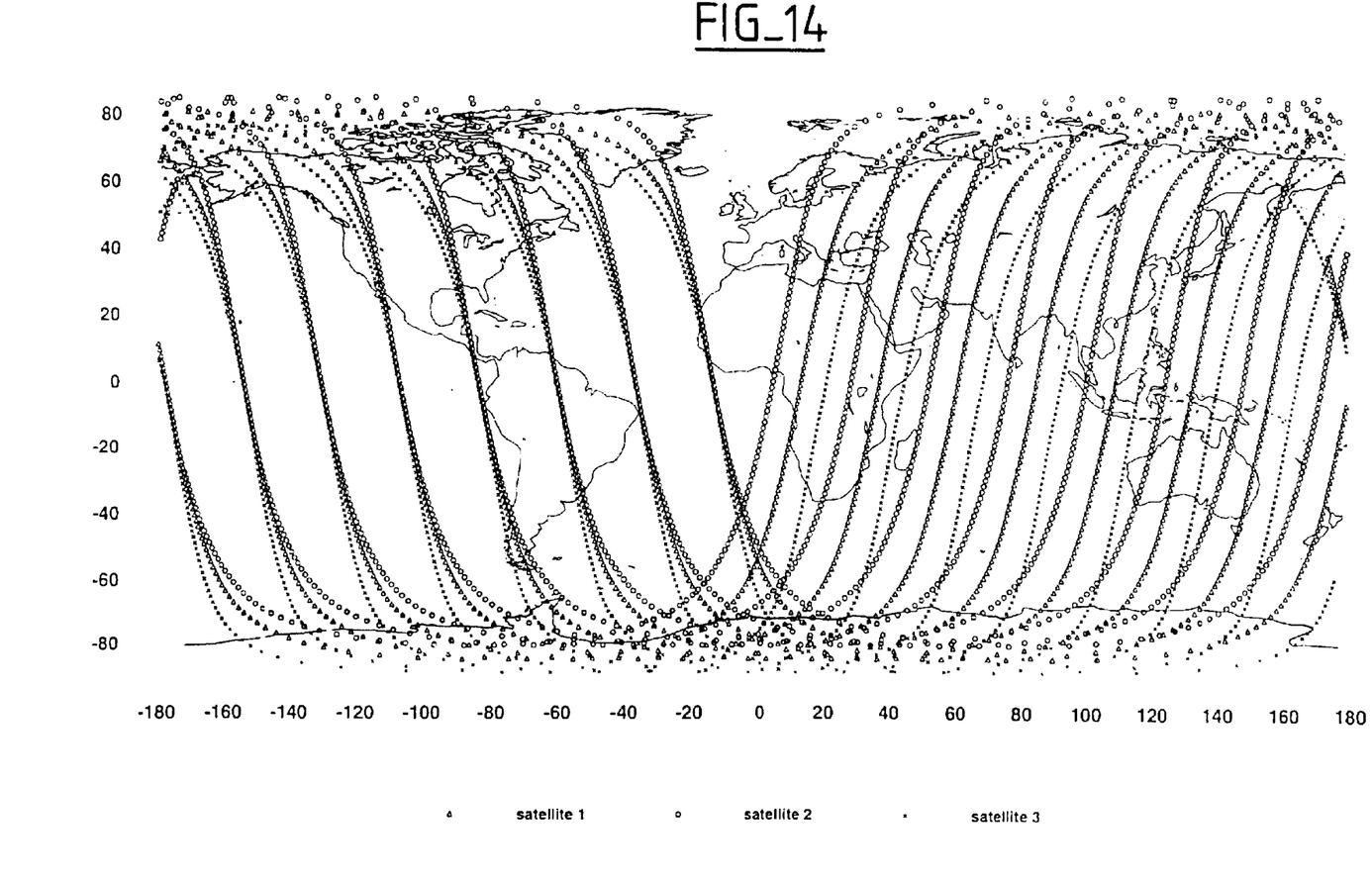
Figure 15:
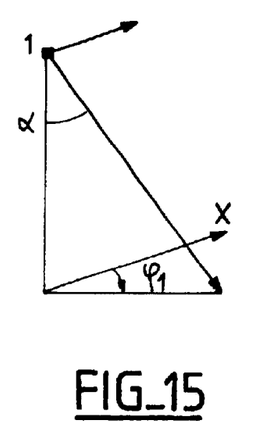
FIGS. 15 to 18 are similar to FIGS. 11 to 14 for another constellation in accordance with the invention comprising three satellites.
Figure 16:
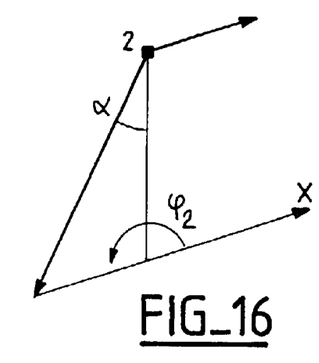
Figure 17:
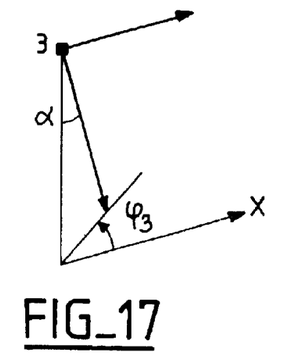

FIGS. 10 to 18 show similar views for a configuration with three satellites. FIG. 10 shows the three satellites in the plane of their polar orbit. The satellites are offset by $\psi_{1,2}$=$\psi_{2,3}$=60° in the orbit. FIG. 11 is a diagrammatic representation of the sight angle of the first satellite of the constellation from FIG. 10; the value of the angle α is 45° and the first satellite sights to the rear left-hand side, with an angle $\phi_1$ of 120°. FIG. 12 is a diagrammatic representation of the sight angle of the second satellite of the constellation; the value of the angle α is again 45° and the angle $\phi_2$ is zero. FIG. 13 is a diagrammatic representation of the sight angle of the third satellite of the constellation; the value of the angle α is again 45° and the value of the angle $\phi_3$ is −120°. FIG. 14 shows the tracks of the three satellites on the surface of the Earth; the two areas can again be seen clearly. In this configuration, the value of each of the parameters a and b is 10 km.

Figure 18:
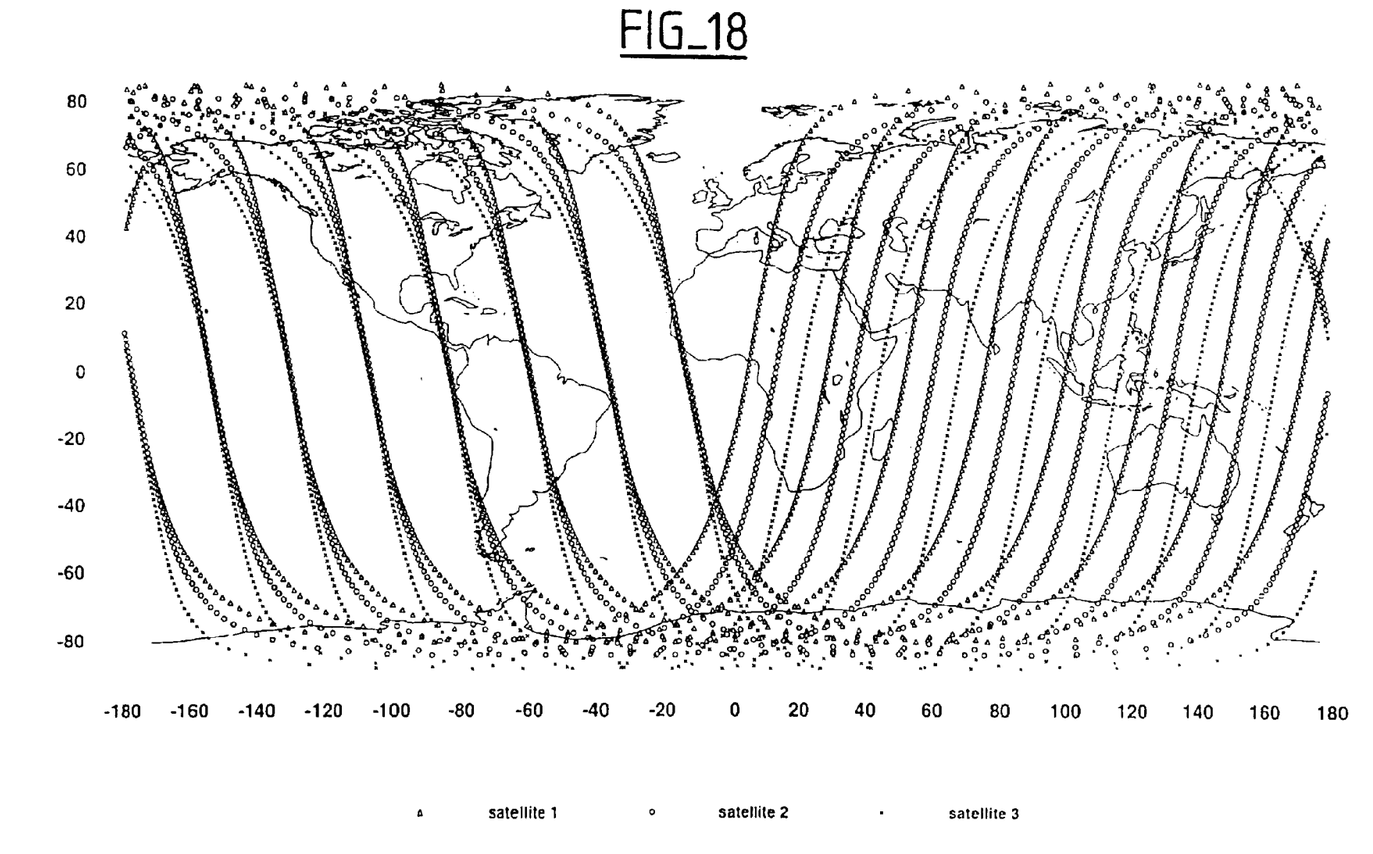

FIGS. 15 to 18 are similar to FIGS. 10 to 14 for another constellation with three satellites. Like that of FIGS. 10 to 14, the constellation comprises three satellites in a polar orbit; the position of the three satellites in their orbit is similar to that of FIG. 10. FIGS. 15 to 18 show the sight angles of the three satellites; in all cases the value of the angle α is 45° and the values of the angles $\phi_1$, $\phi_2$ and $\phi_3$ are respectively −60°, 180° and 60°. FIG. 18 shows the tracks of the satellites, with the same conventions as FIG. 14. The three areas can clearly be recognized again. In this example the value of both the parameters a and b is 10 km.

The examples show that the invention can usefully be employed even with nonzero values of the parameters a and b.

Of course, the present invention is not limited to the examples and embodiments described and shown, many variants of which will suggest themselves to the skilled person. The various conditions set out above can advantageously be combined, but it is also possible for only some of them to be used; only the conditions [1] or [1'] could be used, without using the conditions [2] or [2'], if the required objective were to obtain a distribution in one area but not to obtain a grouping in the other area.

There is claimed:

1. A constellation of satellites for measuring atmospheric wind speeds, said constellation including at least two satellites distributed over the same non-geosynchronous orbit and each carrying a Doppler lidar, wherein the tracks on the surface of the Earth of said sight axis of said satellites of said constellation are substantially coincident in a first area of the surface of the Earth, and are substantially regularly distributed in a second area of the surface of the Earth.

2. A constellation of satellites for measuring atmospheric wind speeds, said constellation including at least two satellites distributed over the same non-geosynchronous orbit and each carrying a Doppler lidar, wherein the sight axis of said Doppler lidar of at least one of said two satellites is fixed.

3. The constellation claimed in claim 1 wherein said orbit is a polar or quasi-polar orbit.

4. The constellation claimed in claim 1 wherein the orbital altitude is from 350 km to 500 km.

5. The constellation claimed in claim 4 including three satellites and in which the orbital altitude is from 400 km to 500 km.

6. The constellation claimed in claim 1 wherein said sight angle of one satellite relative to the nadir is from 30° to 50° and is preferably 45°.

7. The constellation claimed in claim 1 wherein said satellites of said constellation have different angles between the projection of said sight axis on the surface of the Earth and the projection of the speed of said satellite on the Earth.

8. The constellation claimed in claim 7 including two satellites and in which the difference between said angles is from 75° to 105° and is preferably about 90°.

9. The constellation claimed in claim 8 including three satellites and in which the difference between said angles is from 90° to 150° and is preferably about 120°.

10. A constellation of satellites for measuring atmospheric wind speeds, said constellation including at least two satellites distributed over the same non-geosynchronous orbit and each carrying a Doppler lidar, wherein said constellation satisfies the condition:

$$\frac{2\pi T_S}{nT}R < \frac{H}{\cos\gamma}|\tan\alpha_{i+1}\sin\varphi_{i+1} - \tan\alpha_i\sin\varphi_i| + \frac{T_S}{T}R\psi_{i,i+1} \leq a + \frac{2\pi T_S}{nT}R$$

where n is the number of satellites in the constellation, T is the period of rotation of the Earth, $T_S$ is the orbital period, R is the radius of the Earth, H is the orbital altitude, $\gamma$ is the angle between the projection of the speed of satellite i on the surface of the Earth on passing over the equator and the rotation speed of the Earth at the equator, $\alpha_i$ is the angle between the sight axis of satellite i and the nadir, $\phi_i$ is the angle between the projection on the Earth of the sight axis of satellite i and the projection on the Earth of the speed of said satellite, $\psi_{i,i+1}$ is the angle measured in the plane of the orbit between satellites i and i+1, and a parameter analogous to a distance and is less than 500 km.

11. The constellation claimed in claim 10 wherein said parameter a has a value less than 100 km and preferably less than 50 km.

12. A constellation of satellites for measuring atmospheric wind speeds, said constellation including at least two satellites distributed over the same non-geosynchronous orbit and each carrying a Doppler lidar, wherein the angle between said two satellites of said constellation in the plane of said orbit satisfies the condition:

$$\frac{T_S}{T}R\psi_{i,i+1} \leq \frac{H}{\cos\gamma}|\tan\alpha_i\sin\varphi_i - \tan\alpha_{i+1}\sin\varphi_{i+1}| \leq \frac{T_S}{T}R\psi_{i,i+1} + b$$

where T is the rotation period of the Earth, $T_S$ is the orbital period, R is the radius of the Earth, H is the orbital altitude, $\gamma$ is the angle between the projection of the speed of satellite i on the surface of the Earth on crossing the equator and the rotation speed of the Earth at the equator, $\alpha_i$ is the angle between the sight axis of satellite i and the nadir, $\phi_i$ is the angle between the projection of the sight axis of satellite i on the Earth and the projection of the speed of said satellite on the Earth, $\psi_{i,i+1}$ is the angle measured in the plane of the orbit between satellites i and i+1, and b parameter analogous to a distance and is less than 200 km.

13. The constellation claimed in claim 12 wherein said parameter b has a value less than 20 km and preferably less than 10 km.

* * * * *